M. LEITCH.
MASTER PULSATOR FOR MILKING MACHINES.
APPLICATION FILED FEB. 26, 1920.

1,378,881.

Patented May 24, 1921.
3 SHEETS—SHEET 1.

WITNESS:

INVENTOR
Meredith Leitch
BY
ATTORNEY

M. LEITCH.
MASTER PULSATOR FOR MILKING MACHINES.
APPLICATION FILED FEB. 26, 1920.

1,378,881.

Patented May 24, 1921.
3 SHEETS—SHEET 2.

WITNESS:

INVENTOR
Meredith Leitch
BY
Frank S Busser
ATTORNEY.

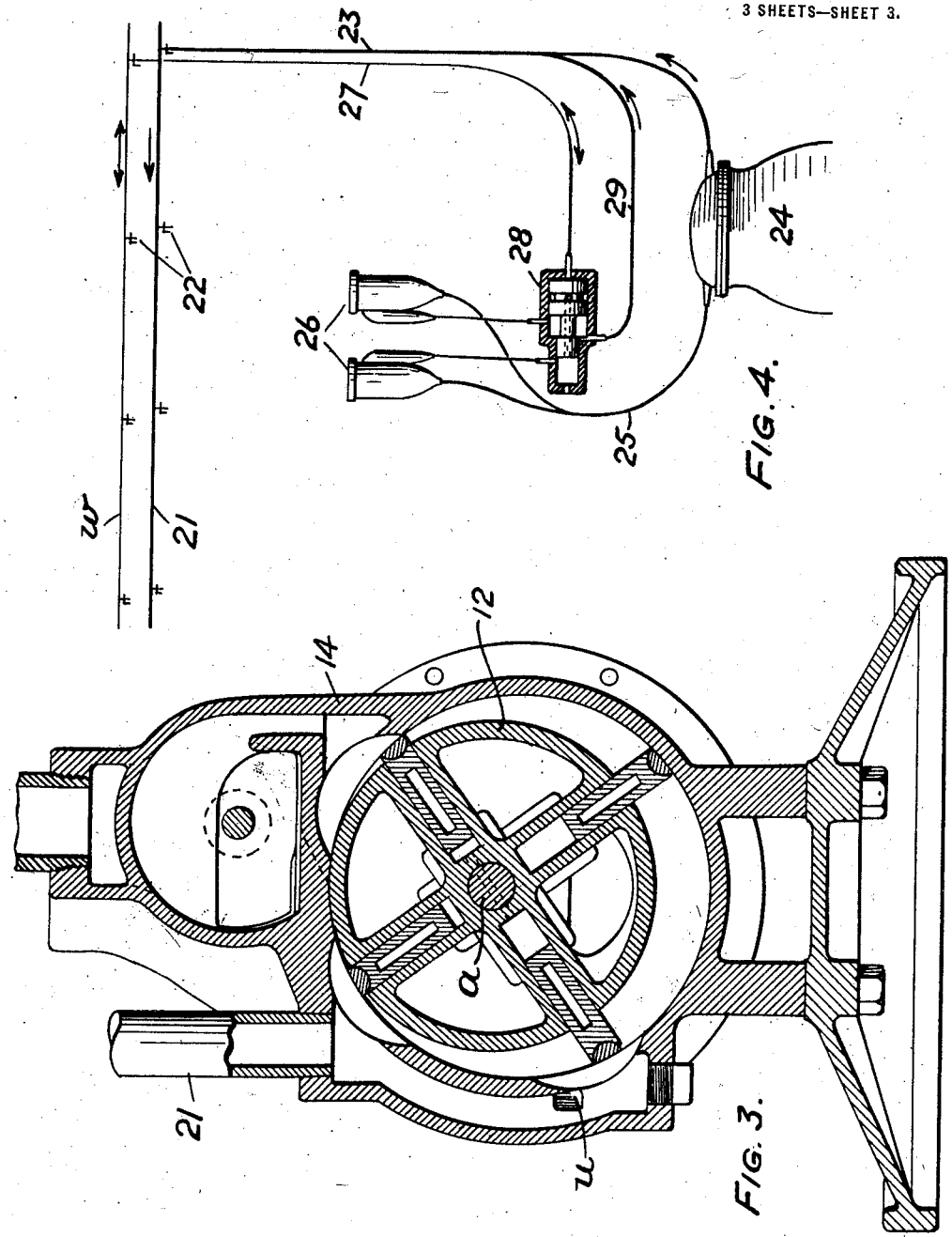

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

MASTER-PULSATOR FOR MILKING-MACHINES.

1,378,881.  Specification of Letters Patent.  Patented May 24, 1921.

Application filed February 26, 1920. Serial No. 361,609.

*To all whom it may concern:*

Be it known that I, MEREDITH LEITCH, a citizen of the United States, residing at Poughkeepsie, county of Dutchess, and State of New York, have invented a new and useful Improvement in Master-Pulsators for Milking-Machines, of which the following is a full, clear, and exact description, reference being had to the accompanying drawings, which form a part of this specification.

My invention is an improvement in operating mechanism for cow milking machines of the type wherein a mechanically driven master valve produces pneumatic pulsations which cause, or control, the movement of other valves adapted to produce the pneumatic pulsations that operate the teat cups to milk the cows.

The object of my invention is to provide a compact, durable, easily lubricated master pulsation valve, provided with certain adjustments that are necessary or advisable and which may be relied on to remain fixed after they are once set.

In the accompanying drawings, which illustrate a preferred embodiment of my invention:

Fig. 3 is a sectional view through the pump.

Fig. 4 is a diagram illustrating a milking machine unit connected to a pulsation and a vacuum pipe.

The pump shaft $a$ carries a pinion $b$ which meshes with and drives a gear $c$. The gear $c$ revolves about a bearing $d$ eccentrically formed on a shank $e$ secured in the pulsator body $f$ by a screw $g$. The gear $c$ carries a crank pin $h$ on which is a block $i$ adapted, as the crank revolves, to slide in a slot $j$ in a pendulum $k$. The pendulum $k$ is oscillatable about a pivot $l$ eccentric to the pivot pin $m$ turnable and clampable in the pulsator body $f$. The pendulum and the slot therein extend below the lowest position of the crank pin. In the lower part of the slot fits a block $n$, which is carried on a pin $o$ in ears $p$ on top of a valve $q$ reciprocable between guides $r$ on the valve seat $s$. In the seat $s$ is a vacuum port $t$ (communicating by a passage $u$ with the vacuum chamber and vacuum pipe 21 of the pump) and a pulsation port $v$. The port $v$ is adapted for connection with a pulsation pipe $w$, as shown in Fig. 4. At each end of its ends the valve has, bearing on the seat, a surface large enough to more than cover the entire pulsation port $v$ and between these contacts has a cavity $x$ long enough to cover the vacuum port $t$, the space between it and the pulsation port $v$ and half the valve travel. The ears $q$ with two cross walls $y$ form, on the top side of the valve, an oil reservoir $z$, from which wicks 11 lead to the edges of the valve.

When the pump is in operation the shaft $a$, and with it the pinion $b$, revolve and drive the gear $c$ carrying the crank $h$. As the crank $h$ revolves it causes the pendulum $k$ to oscillate. The oscillation of the pendulum effects reciprocation of the valve $q$ over its seat $s$, thereby connecting the pulsation port $v$ alternately with the atmosphere and the vacuum port $t$. This causes alternate pressure and vacuum waves in the pipe $w$.

The bearing $d$ is eccentric with its shank $e$ so that it may be turned to adjust the distance of the center of the bearing $d$ from the center of the shaft $a$ to fit different sizes of pinions $b$.

Figure 1:
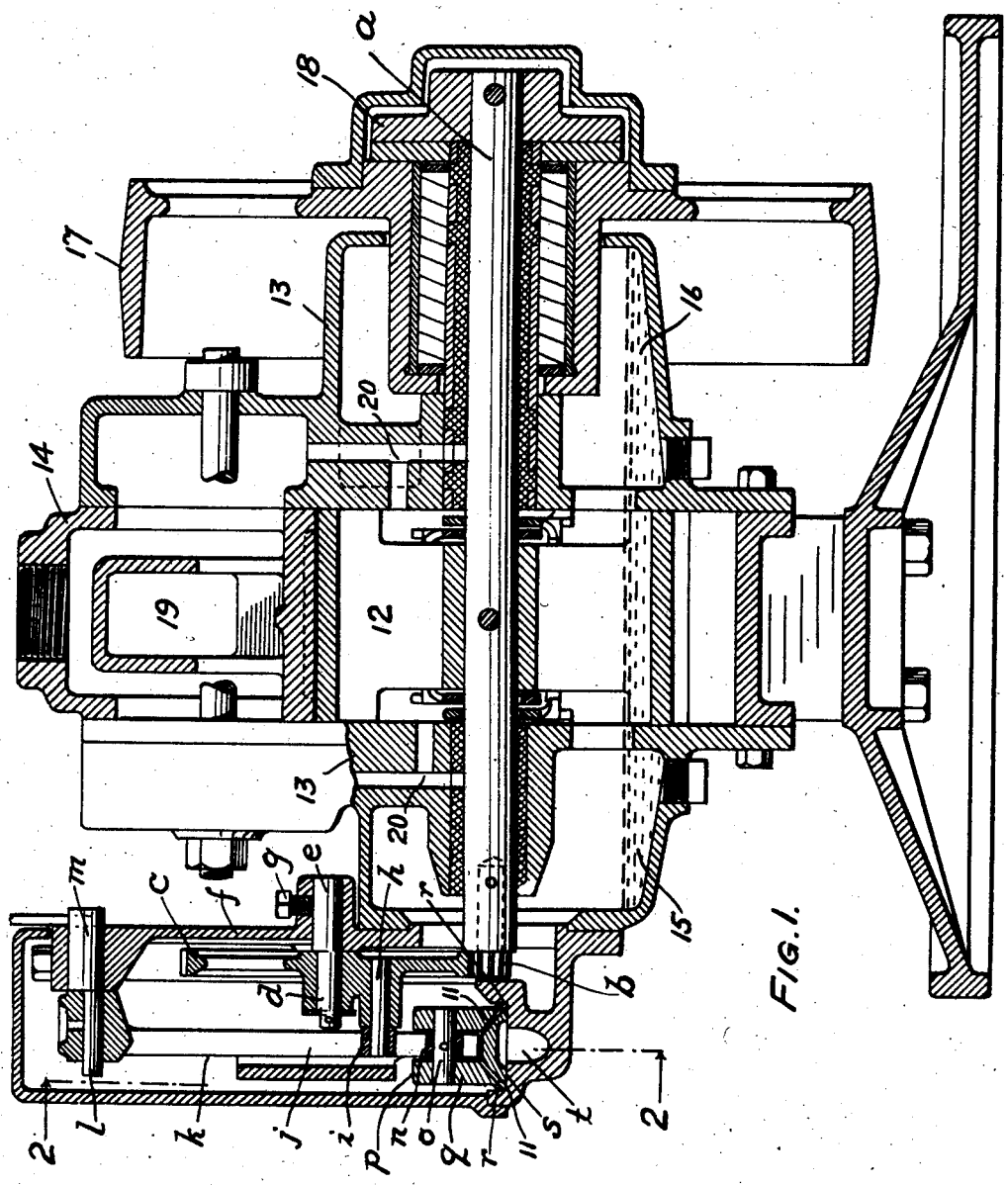
Figure 1 is a cross-section of the master pulsator attached to a vacuum pump.
Figure 2:
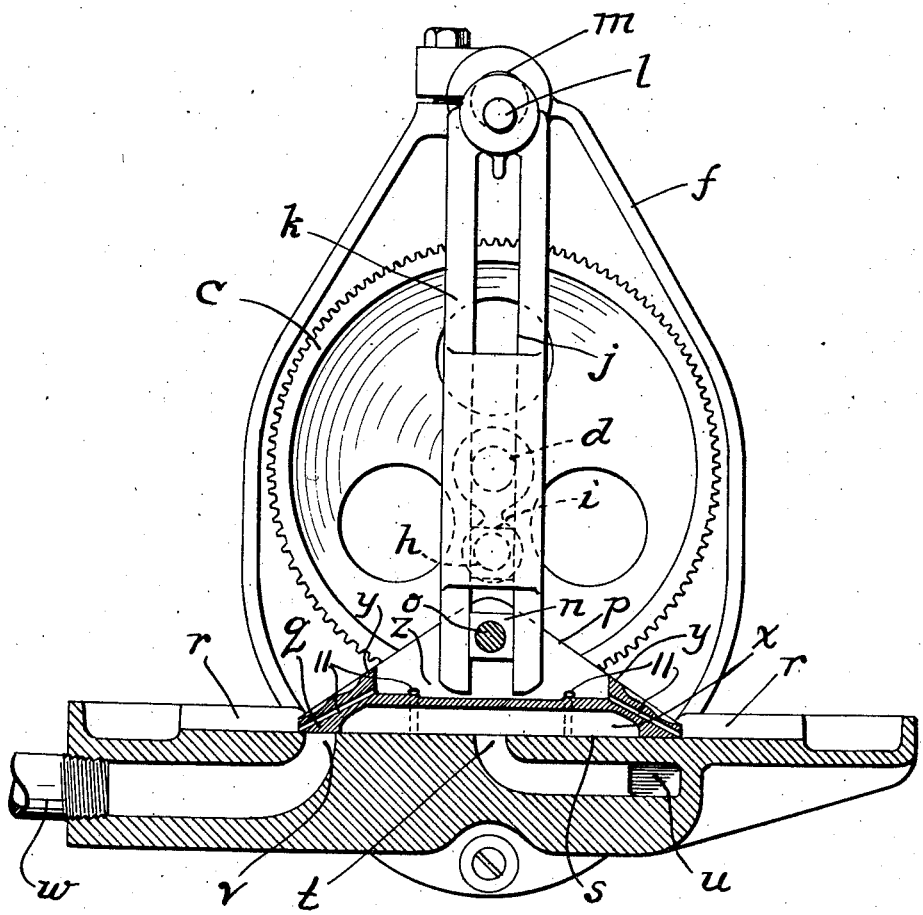
Fig. 2 is an enlarged longitudinal section on the line 2—2 of Fig. 1.

When the pulsation pipe $w$ is short the port $v$ needs to be open to atmosphere for the same length of time that it is open to vacuum; but if the pipe is long the port $v$ should be open to vacuum for a longer time than it is to atmosphere. By adjusting the pivot $l$ toward the right in Fig. 2, the time of connection of port $v$ with port $t$ may be increased as desired.

When there is oil in the reservoir on the top of the valve, it seeps down through the wicks 11 to the edges and is drawn in by the vacuum, thus oiling the entire contact of the valve with its seat and guides.

From the above it may be seen that I have produced a master pneumatic pulsator which is compact, which may be properly lubricated for long runs, and which is easily adjusted for speed and for the division between vacuum and pulsation waves, and which when set for a given adjustment will reliably maintain such adjustment.

I have illustrated my invention as associated with a vacuum pump mounted on the shaft $a$. The principal elements of the pump are the rotor 12, the heads 13, 13 affording bearings for the shaft $a$, the housing 14, oil reservoirs 15 and 16 communicating with the inside of rotor 12, a driving pulley 17, a flexible coupling 18 through which the driving pulley drives the shaft $a$, an oil separator 19, and oil ducts 20, 20, communicating with the shaft and the inside of the rotor. This vacuum pump is described in detail in an application filed by me February 3, 1920, Serial No. 356,014. It will be understood, however, that the present invention is adapted for use in connection with any source of vacuum.

In Fig. 4 I have illustrated diagrammatically a milking machine unit comprising a pail 24, teat cups 26 and a secondary pulsator 28. 22 are cocks on the pulsation pipe $w$ and the vacuum pipe 21, to which may be connected the flexible tubes 23 and 27. The tube 23 is connected to the milk pail and the vacuum pipe 21, which is in turn connected to the pump, while the tube 27 is connected to the pulsator pipe $w$ and the secondary pulsator 28. 25 is a flexible tube connecting the inner chambers of the teat cups with the milk pail 24, and 29 is a flexible tube connecting the vacuum chamber of the secondary pulsator with the tube 23.

Having now fully described my invention, what I claim and desire to protect by Letters Patent is:

1. In a master pulsator, the combination of a driving shaft, a pinion thereon, a gear in driving engagement with the pinion, a slotted pendulum, a crank on the gear engaging the slot of the pendulum, a ported valve seat, and a valve reciprocable on said seat and operable by the pendulum.

2. In a master pulsator, the combination of a driving shaft, a pinion thereon, a gear in driving engagement with the pinion, a slotted pendulum, a crank on the gear engaging the slot of the pendulum, a ported valve seat, a valve reciprocable on said seat and operable by the pendulum, and a casing inclosing the valve, pendulum and gear and on which the gear is turnable and the pendulum pivotally suspended.

3. In a master pulsator, the combination of a driving shaft, a pinion thereon, a gear in driving engagement with the pinion, a slotted pendulum, a crank on the gear engaging the slot of the pendulum, a horizontal ported valve seat, and a valve reciprocable on said seat and a guide therefor in the slot of the pendulum.

4. In a master pulsator for milking machines, the combination of a valve seat, having a pulsation port and a vacuum port, a reciprocatory valve slidable on the valve seat and having a cavity adapted in one position to connect the pulsation port with the atmosphere and in another position to connect the pulsation port with the vacuum port, pendulum carrying the valve, and means to oscillate the pendulum.

5. In a master pulsator for milking machines, the combination of a straight faced valve seat having a pulsation port and a vacuum port, a reciprocatory valve slidable on the valve seat and having a cavity adapted in one position to connect the pulsation port with the atmosphere and in another position to connect the pulsation port with the vacuum port, a slotted pendulum, and means to oscillate the pendulum, the valve being carried in the slot of the pendulum.

6. In a master pneumatic pulsator for milking machines, the combination of a valve seat having a vacuum port and a pulsation port, a pendulum, means to oscillate the pendulum, and a valve carried by the pendulum and adapted in opposite positions to connect the pulsation port respectively with atmosphere and the vacuum port and in a mediate position to close the pulsation port.

7. In a master pneumatic pulsator, the combination with a driven shaft adapted to carry any one of several sizes of pinion, and a geared crank drivable by said pinion, of a crank bearing securely adjustable to cause proper meshing of the gear with the desired size of pinion.

8. In a master pulsator, the combination of a driving shaft, a pinion thereon, a gear meshing with the pinion, a pendulum, a valve carried by the pendulum, means to oscillate the pendulum from the gear, and an adjustable eccentric bearing on which the gear is turnable to adapt it to mesh with any given sized pinion.

9. In a master pulsator for milking machines, the combination of a valve seat having a pulsation port and a vacuum port, a reciprocatory valve slidable on the valve seat and having a cavity adapted in one position to connect the pulsation port with the atmosphere and in another position to connect the pulsation port with the vacuum port, a pivoted pendulum carrying the valve, means to oscillate the pendulum, and means to adjust the pivot of the pendulum to vary the relative lengths of time during which the pulsation port is connected with the atmosphere and the vacuum port respectively.

10. In a master pneumatic pulsator, the combination with a mechanically driven crank, a slotted pendulum oscillated by said crank, a ported valve seat, and a valve reciprocable thereon by the pendulum, of an adjustable pendulum pivot whereby the relative times of openings of ports may be regulated.

11. In a master pulsator, the combination of a ported valve seat, a valve reciprocable thereon, an oscillatable pendulum carrying the valve; means to oscillate the pendulum, and an adjustable pivot on which the pendulum oscillates.

12. In a master pulsator, the combination of a driving shaft, a pinion thereon, a gear meshing with the pinion, a ported valve seat, a valve reciprocable thereon, an oscillatable pendulum carrying the valve, means to oscillate the pendulum from the gear, an adjustable eccentric bearing on which the gear is turnable and an adjustable eccentric pivot on which the pendulum is oscillatable.

13. In a master pneumatic pulsator for milking machines, the combination of a valve seat having a vacuum port and a pulsation port, a pendulum, means to oscillate the pendulum, and a valve carried by the pendulum and adapted to slide on the valve seat, said valve having, in the surface contacting with the seat, a cavity of a minimum length equal at least to the sum of the width of the vacuum port, the distance between the two ports and half the valve travel.

14. In a master pneumatic pulsator for milking machines, the combination with a mechanically driven crank and crank pin, a pendulum, and a pivot about which the pendulum is oscillatable, the pendulum having a slot with which the crank pin is in driving relation, of a valve seat having a pulsation port and a vacuum port, valve guides, and a valve reciprocable by the lower end of said pendulum and adapted in a mediate position to close the pulsation port, in a position at one side of said mediate position to connect the pulsation port with the vacuum port and in a position at the other side of said mediate position to admit air to the pulsation port.

15. In a master pneumatic pulsator for milking machines, the combination with a mechanically driven crank, a pendulum, and a pivot about which the pendulum is oscillatable, the pendulum having a slot with which the crank pin is in driving relation, of a valve seat having a vacuum port and a pulsation port, valve guides, a reciprocable valve, with its exterior exposed to atmospheric pressure, adapted to slide on the seat and having, in the surface in contact with the seat, a cavity with a length equal at least to the sum of the width of the vacuum port in the seat, the distance between the two ports and half the valve travel, and a drive pin attached to the upper side of the valve and adapted to enter the bottom of the slot in the aforementioned pendulum whereby oscillation of the pendulum effects reciprocation of the valve.

16. In a master pneumatic pulsator, the combination with a mechanically driven crank, a pendulum oscillatable by said crank, and a valve seat, of a valve having an oil reservoir on its upper side and wicks therefrom to the edges of the valve.

In testimony of which invention, I have hereunto set my hand, at Poughkeepsie, N. Y., on this 18 day of February, 1920.

MEREDITH LEITCH.